United States Patent [19]
Gross et al.

[11] Patent Number: 5,348,511
[45] Date of Patent: Sep. 20, 1994

[54] BEEHIVE-MOUNTED DEVICE FOR UTILIZING HONEYBEES (HYMENOPTERA: APIDAE) IN THE DISSEMINATION OF BIOCONTROL AGENTS

[75] Inventors: Harry R. Gross, Tifton; Raydene Johnson, Lenox; J. C. Walters, Tifton, all of Ga.

[73] Assignee: The United States of America as represented by the Secretary of Agriculture, Washington, D.C.

[21] Appl. No.: 62,516

[22] Filed: May 12, 1993

[51] Int. Cl.$^5$ ............................................. A01K 47/06
[52] U.S. Cl. .......................................... 449/2; 449/20
[58] Field of Search .................... 449/2, 18, 19, 20, 25

[56] References Cited

U.S. PATENT DOCUMENTS

| 1,659,640 | 2/1928 | Smith | 449/20 |
|---|---|---|---|
| 2,435,951 | 2/1948 | Antles | |
| 3,371,360 | 3/1968 | Antles et al. | |
| 4,412,363 | 11/1983 | Robson | |
| 4,435,866 | 3/1984 | Brown | |
| 4,517,694 | 5/1985 | Hong | 449/19 |
| 4,594,744 | 6/1986 | Ferrari | |

FOREIGN PATENT DOCUMENTS

| 834790 | 3/1952 | Fed. Rep. of Germany | 449/20 |
|---|---|---|---|
| 640843 | 7/1950 | United Kingdom | 449/20 |
| 1470385 | 4/1977 | United Kingdom | |

OTHER PUBLICATIONS

Amer. Phytopatho. Soc. 77(2): 167-172 (1987), Childress et al., Bee-Mediated Transmission of Blueberry Leaf Mottle Virus Via Infected Pollen in Highbush Area.
J. of Plant Diseases and Protection 95(6): 606-610 (1988). Abbas, Interactions Between Nuclear Polyhedrosis Virus, Host and Predators.
J. Econ Entomol. 61(3), 673-676 (1968), Lewis et al, A Three-Year Study of Parasites of the Bollworm and the Tobacco Budworm in Mississippi.
J. Econ. Entomol. 59(2), 382-384 (1966). Young et al., Nuclear-Polyhedrosis Viruses in Control of Corn Earworm and Fall Armyworm in Sweet Corn.
J. Entomol. Sci. 23(4): 394-398 (Oct. 1988). Kring et al., The Striped Lynx Spider, Oxyopes Salticus Hentz (Araneae: Oxyopidae), as a Vector of a . . . .
Indian J. of Ag. Sciences 58(8): 661-663 (Aug. 1988). Vyas et al., Transmission of Nuclear Polyhedrosis Virus of Heliothis Armigera (Lepidoptera: Noctuidae) . . . .
J. Entomol. Sci. 24(4): 500-506 (Oct. 1989). Young et al., Nuclear Polyhedrosis Virus by the Parasitoid Microplitis Croceipes (Hymentera: Braconidae) . . .
Environ. Entomology 19(2): 251-256 (1990). Young et al., Transmission of Nuclear Polyhedrosis Virus by the Parasitoid Microplitis croseipes . . .
J. Entomol. Sci. 20(2): 212-218 Apr. 1985). Young et al., Compatibility of Two Fall Armyworm Pathogens with the Predaceous Beetle, Calosoma Sayi . . .
Southwestern Entomologist 14(2): 136-146 (1989). Brown et al, Transmission of Heliothis NPV by Microplitis Croceipes (Cresson) in Heliothis Virescens (F.).
Entomophaga 32(4): 387-397 (1987). Ali et al., Transmission of NPV in Uniform- and Mixed-Age Populations of Heliothis Zea (Lep.: Noctuidae) on Caged . . .
J. of Invert. Path. 24: 70-81 (1974). Hamm et al., Mode of Transmission of Nuclear-Polyhedrosis Virus to Progeny of Adult Heliothis zea.
Microbial Control of Entopathogens: Virus, Allen et al (eds), pp. 46-55 (1978). Gard et al, Autodissemination of Entomopathogens: Virus.
J. of Invert. Path. 7, 227, 235 (1965). Ignoffo et al., The Nuclear-Polyhedrosis Virus of Heliothis zea (Boddie) and Heliothis virescens (Fabricius).
Entomol. Exp. Appl. 46: 181-186 (1988). Olofsson, Dispersal of the Nuclear Polyhedrosis Virus of Neodiprion Sertifer from Siol to Pine Foliage with Dust.

Primary Examiner—Robert P. Swiatek
Attorney, Agent, or Firm—M. Howard Silverstein; John D. Fado; Gail E. Poulos

[57] ABSTRACT

Biocontrol agents are disseminated for the control of pests by *Apis mellifera* L. using a device inserted into a modified down-sized super which is integrated as a substructure of a conventional, commercial beehive. The device provides separate entry and departure pathways which allows exiting bees to be surface-contaminated with the biocontrol agent as they exit the hive.

18 Claims, 5 Drawing Sheets

BEEHIVE-MOUNTED DEVICE FOR UTILIZING HONEYBEES (HYMENOPTERA: APIDAE) IN THE DISSEMINATION OF BIOCONTROL AGENTS

FIELD OF THE INVENTION

This invention relates to a device mounted into a beehive substructure that includes a receptacle containing biocontrol agents which are picked up, carried, and disseminated by honeybees colonizing the hive and to a method for using the device.

BACKGROUND OF THE INVENTION

Honeybees, specifically *Apis mellifera* L., are highly efficient foragers on numerous flowering plants, including agricultural crops, that host phytophagous insect pests. Because honeybees are captive populations and because of their access to flowering plants, they can provide an economical and non-intrusive means of conveying biocontrol agents against pest species. The present invention is a honeybee hive-compatible device and associated housing for assisting honeybees in the dissemination of biocontrol agents for insects and other plant pests.

To be effective, biocontrol agents, like conventional pesticides, must be critically timed, uniformly distributed, and available in appropriate dosage to the targeted host species. Unlike conventional chemical pesticides, which are generally toxic, many biocontrol agents are host specific or attack a narrow range of hosts. Furthermore, with the declining arsenal of chemical pesticides, and the renewed national interest in air and ground water quality there is a need for effective biocontrol agents as well as a means for disseminating the agent. Biocontrol agents can be conveyed into the agroecosystem by a variety of non-conventional methods including autodissemination (Gard & Falcon 1978, Ali et al. 1987, Elmore et al. 1964, Ham et al. 1974), predators (Abbas 1988, Young et al. 1985, King et al. 1988), parasites (Young et al. 1989a, b; Brown et al. 1989), insectivorous birds (VYas et al. 1988), honeybees (Childress et al. 1987), blown dust (Olofsson 1988), and others. Of the nonconventional conveyances, only honeybees, *A. mellifera*, provide a readily available vector whose colonies can be easily manipulated and transported. Furthermore, honeybee foraging areas, to a large extent, can be managed by man.

There are known devices mounted on the opening of beehives which direct bees in and out of the hive. Such devices also include structures for collecting pollen from a bee or for surface-contaminating a bee with live pollen for dissemination outside the hive.

For instance, U.S. Pat. No. 4,594,744 ('744) discloses a hive entrance modifier forming a single downwardly sloping ramp used by both incoming and outgoing bees. Pollen is poured into the funnel-shaped region formed by the ramp and is picked up by bees coming and going. The disadvantage of the device is that bees not only disseminate pollen outside the hive onto targeted agricultural crops, but carry the valuable pollen inside the hive, such that a large percentage of the pollen never reaches it's intended target. A similar device is disclosed in U.S. Pat. No. 3,371,360 ('360) and has the same disadvantage.

U.S. Pat. No. 2,435,951 discloses a device positioned in the opening of a beehive that includes a pollen chamber. The chamber is remote from the exit opening of the device requiring not only an intricate passageway but possible loss of pollen prior to the bees exiting the hive. A similar device is disclosed in United Kingdom Patent No. 1,470,385 and has the dame disadvantage.

The present invention provides a safe, simple, cost effective, alternative strategy for conveying biocontrol agents to specific targeted sites which is different from the enpollinating prior art devices.

SUMMARY OF THE INVENTION

It is, therefore, an object of the present invention to provide a simple structure which is adapted to a conventional commercial hive, providing separate ingress and egress pathways for honeybees wherein the biocontrol agent to be disseminated is located in the egress pathway just behind the exit opening of the beehive.

It is also an object of the present invention to provide a method for disseminating biocontrol control agents by honeybees using the disclosed device.

Further objects and advantages of the invention will become apparent from the following description.

DETAILED DESCRIPTION OF THE INVENTION

Figure 2A:
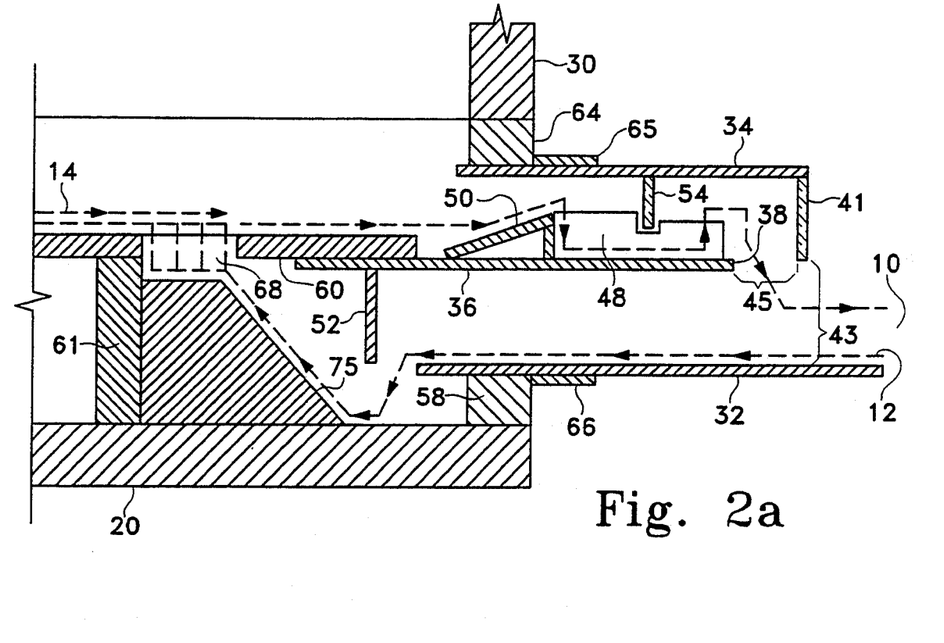
FIG. 2a shows a cross-section of the device taken along line 2a—2a of FIG. 1.
Figure 2B:
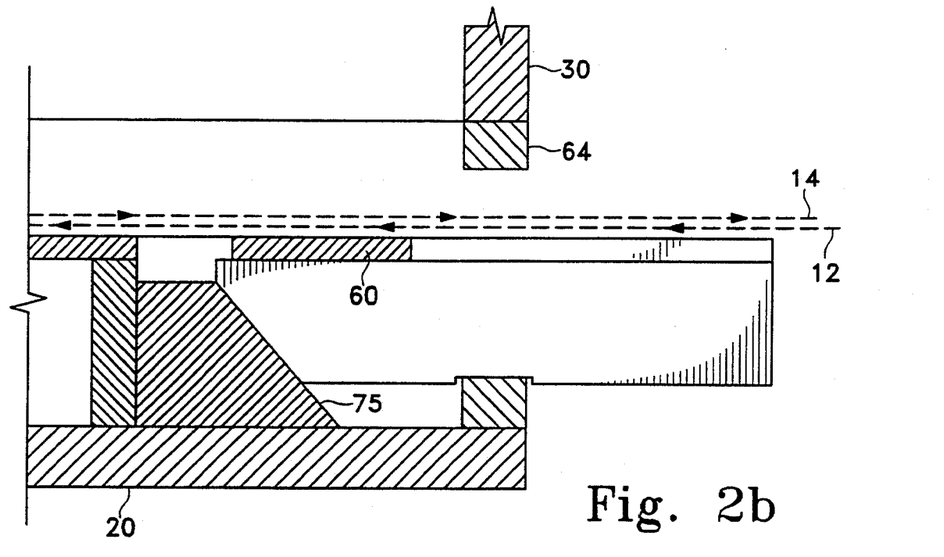
FIG. 2b shows a cross-section like the cross-section of FIG. 2a but showing a more conventional pathway produced by removing the device of the invention and inserting a wooden insert in place thereof.

FIG. 2b shows a cross-section which illustrates the conventional honeybee arrival and departure pathways. The pathways are linear and indistinguishable from one another. The structure and device 10 of the present invention, referred to hereafter as the Biocontrol agent application device (BAAD) 10 (FIG. 2a), has separate arrival 12 and departure 14 pathways.

BAAD 10, as shown on FIG. 2a, is housed in a nine centimeter high downsized super (shallow hive body) placed between beehive bottom board 20 and the bottom of a conventional commercial hive body 30. BAAD 10 is constructed of transparent plexiglass and sheet metal and is designed to be easily inserted in an opening of about 7.2 cm high by a range of about 10.0 to about 28.0 cm wide for an eight frame hive and from about 10.0 cm to about 32.0 cm wide for a ten frame hive. The opening is cut in the center of the front of the downsized super. For an eight frame hive, a preferable width is 20.4 cm.

BAAD 10 as shown in FIG. 2a, includes elongated floor member 32, elongated ceiling member 34, elongated dividing member 36 and structural side walls (not shown). Each of members 32, 34, and 36 has a width substantially equal to each other and about equal to the width of a standard hive opening, which opening is approximately 20–22 centimeters wide. The lengths of the members vary as discussed below.

As shown in FIG. 2a, ceiling member 34 and floor member 32 are linear, parallel, and spaced apart from one another. Floor member 32 is approximately 14.5 centimeters long and extends beyond both the front and rear ends of ceiling member 34 which is approximately 9.5 centimeters long. Positional between members 32 and 34 is dividing member 36 which is substantially parallel to members 32 and 34. The ceiling member 34 is spaced apart from the dividing member 36 by a distance of about 2.4 centimeters and the dividing member 36 is spaced apart from the floor member by a distance of about 2.6 centimeters. Dividing member 36 creates arrival pathway 12 and departure pathway 14. The front end 38 of dividing member 36 is positioned rearward relative to the front end of the ceiling member and approximately 1.8 centimeters rearward of the front end of the floor member. The length of dividing member 36 is approximately equal to the length of floor member 32 but having its front end approximately 3.5 centimeters behind the front end of the floor member and extends approximately 3.5 centimeters beyond the rearward end of the floor member.

Connected to the front end of ceiling member 34, perpendicular thereto and depending a distance downwardly of about 2.4 centimeters toward dividing member 36, is a transparent cover member 41. Cover member 41 and floor member 32 define opening 43, and the distance separating cover member 41 from dividing member 36 defines exit 45. Dividing member 36 has positioned on the top surface thereof an elongated, removable tray 48. The tray can be constructed from plexiglass, wood, or metal. A preferable material is galvanized 28 gauge metal. Tray 48 is approximately 4.8 centimeters wide and 19.5 centimeters long. Tray 48 rests on the front end portion of the dividing member 36, and is slidingly removable from this surface in the direction shown by arrows 49 shown in FIG. 3a. Positioned just behind and leading up to tray 48 is a positively sloped incline 50. Connected to the bottom surface of dividing member 36, perpendicular thereto and approximately 1.8 centimeters from the rear end of the dividing member 36 is a downwardly extending baffle 52 which is opaque. A second baffle 54, connected to the bottom surface of the ceiling member, is perpendicular thereto and extends downwardly therefrom into the top volume of tray 48. Baffle 54 is transparent.

The rear end of each of the ceiling member, the floor member, and the dividing member provides frictional contact with the downsized super. Specifically, the bottom surface of floor member 32 frictionally contacts the top surface of blocking member 58, the top surface of dividing member 36 frictionally contacts the bottom surface 60 of down sized super structure 61 and the top surface of ceiling member 34 frictionally contacts the bottom surface of blocking member 64. There is sufficient play or flexibility and rigidity in the rearwardmost portions of member 32, 34, and 36 to provide this frictional contact between device 10 and the opening of the downsized super structure. Stop member 66 and 65 are glued to specific sites on the bottom of floor member 32 and the ceiling member 34 to prevent extending device 10 too far within the interior of downsized super structure 61.

Just forward of downsized super structure 61 is elongated opening 68. This is the juncture of the arrival and departure pathways and is covered with a mesh screen 70 of welded wire (hardware cloth) having a plurality of 0.6 centimeters$^2$ openings 72 (see FIGS. 2a, 3a). Two end openings 74 in the wire covering are approximately 1.2 centimeters$^2$. Opening 68 ensures open communicating pathways between arrival pathway 12, the hive itself, and departure pathway 14.

All surfaces of the BAAD are spray painted black except for cover member 41 and baffle 54. Some of the plastic surfaces must be non-skid surfaces for entering and exiting bees. These can be scribed surfaces, nine mesh per centimeter plastic screen, cheesecloth, or black paint containing sand or any other abrasive material. Floor member 32, incline 50, and the bottom of interior of tray 48 all have non-skid surfaces. Incline 75 is constructed of roughcut wood which is naturally textured but could be plastic if treated as described above.

Figure 3A:
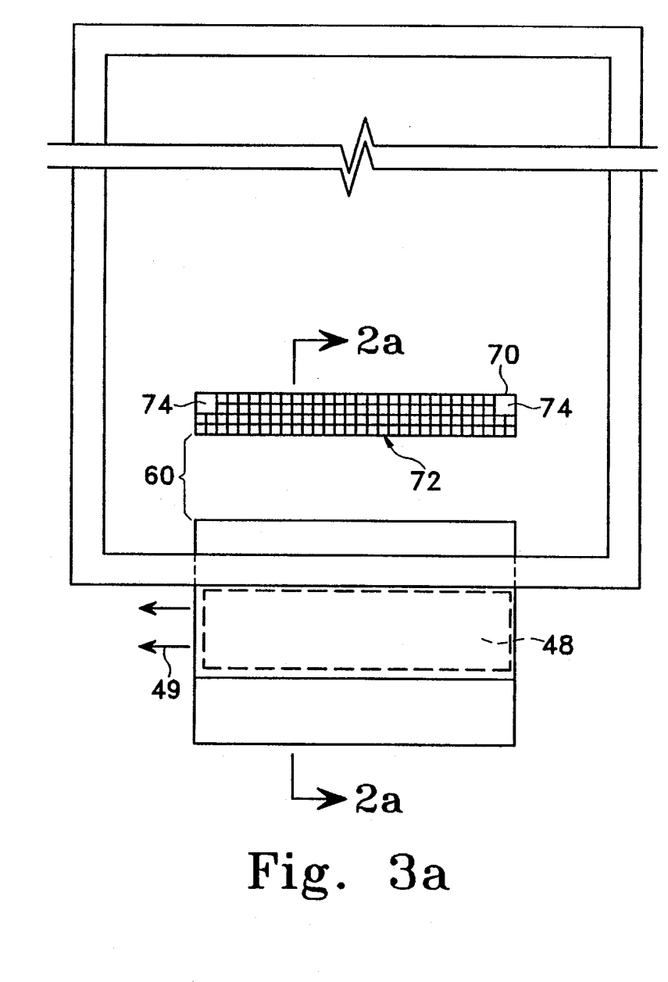
FIG. 3a shows a top view of a down sized super having the device of the invention mounted therein.
Figure 3B:
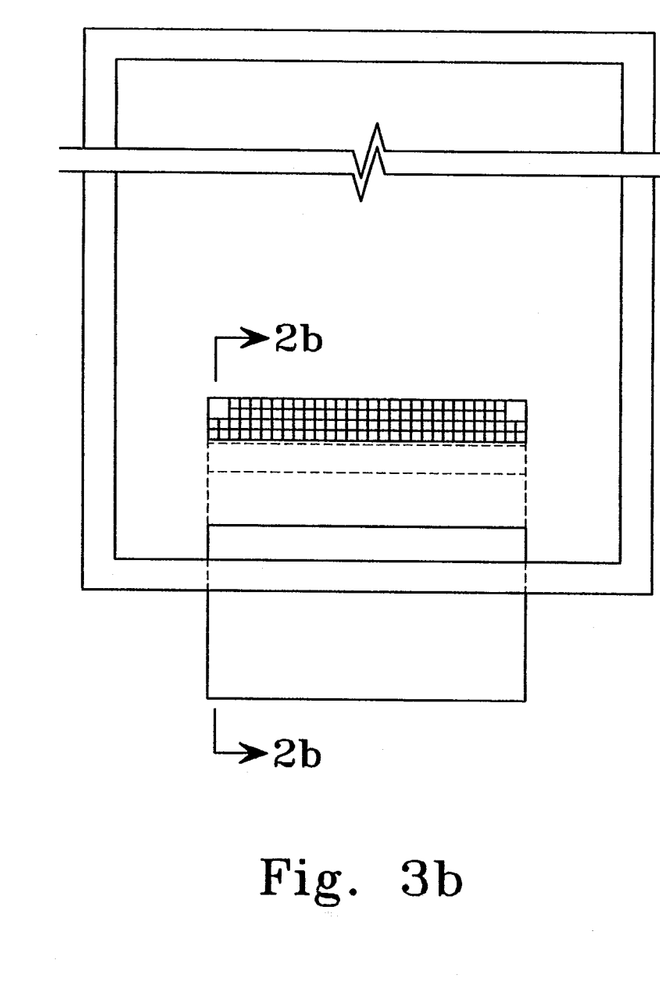
FIG. 3b shows a top view similar to that of FIG. 3a wherein the removable wooden insert of FIG. 2b is positioned within the super opening instead of the device of the present invention.
Figure 4A:
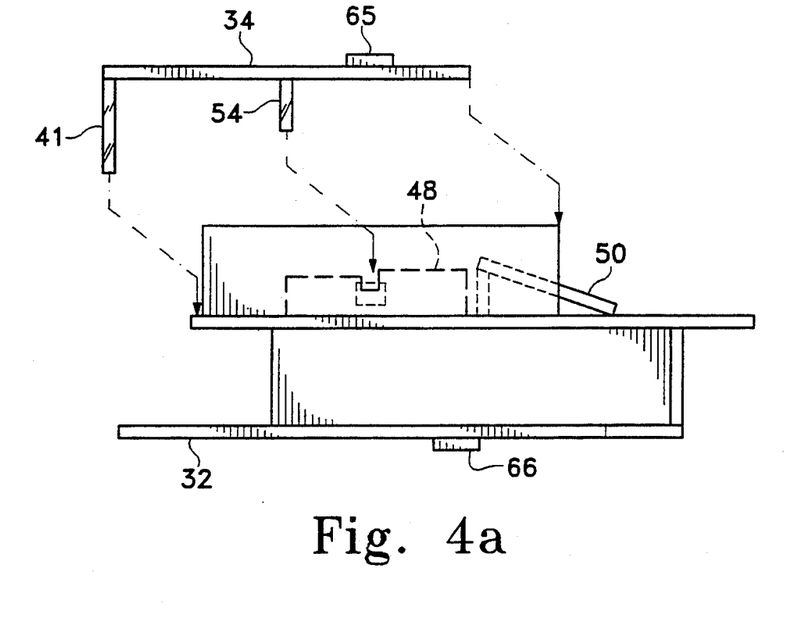
FIG. 4a shows a disassembled right side view of the device of the invention.
Figure 4B:
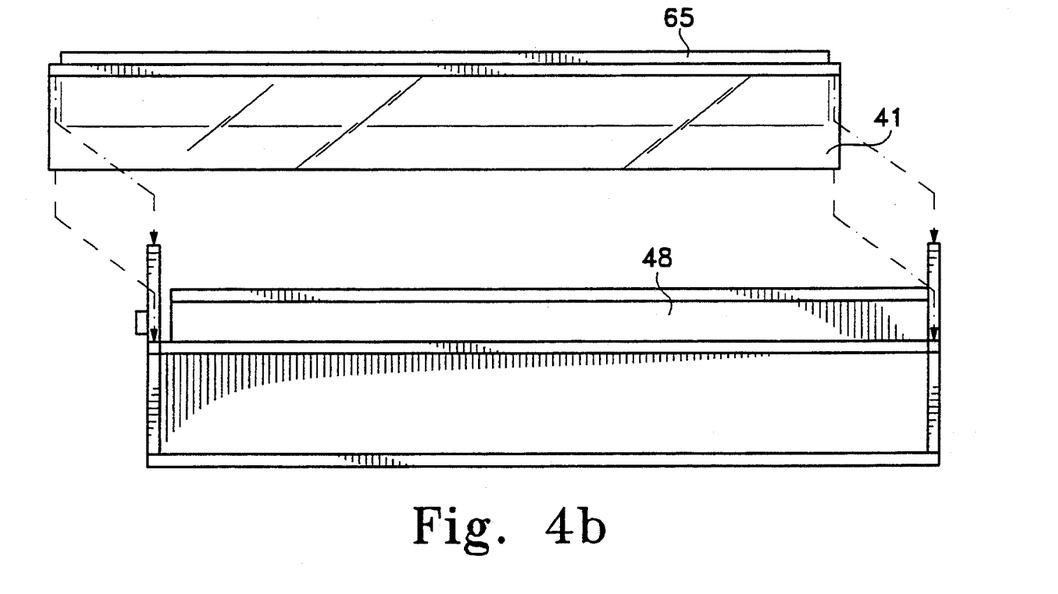
FIG. 4b shows the front view of a disassembled device of the invention.
Figure 5A:
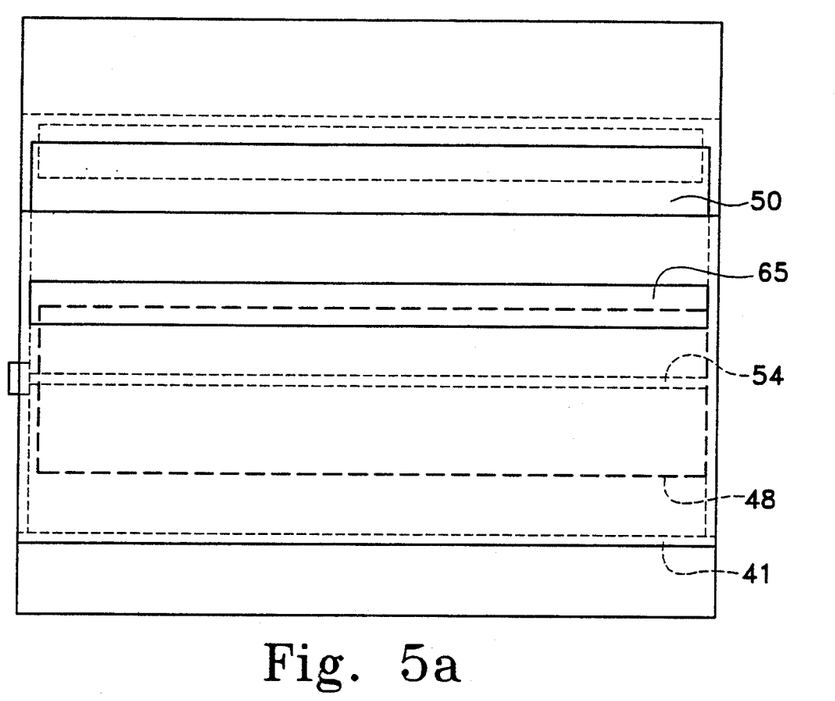
FIG. 5a shows a top view of the device of the invention.
Figure 5B:
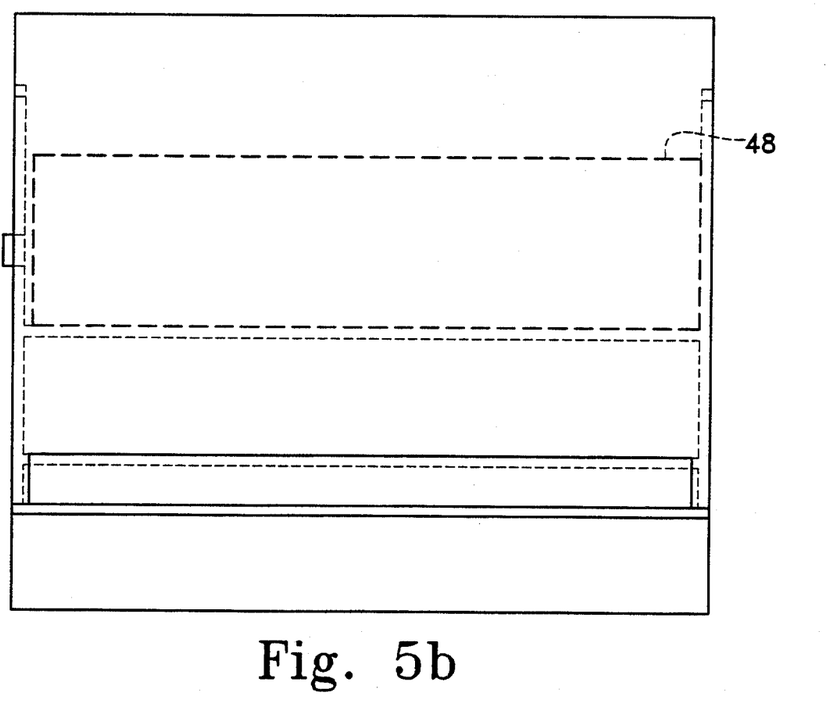
FIG. 5b shows a bottom view of the device of the invention.

In operation, worker honeybees enter the front of the BAAD through opening 43 (19.3 centimeters by 1.5 centimeters) at the bottom of the BAAD (FIGS. 2a, 5b). The bees travel over arrival pathway 12 then ascend an inclined walkway 75 (FIG. 2a) toward the frames of the bottom hive body, passing in the process through 20.3 centimeters by 2.8 centimeters opening 68 covered with the welded wire (hardware cloth) 70 (FIGS. 2a, 3a). Two end openings in the wire covering can be enlarged to 1.2 centimeters$^2$ to accommodate larger-bodied drones (FIG. 3a). The wire covering 70 permits easy access to the hive interior for worker bees, but yet discourages egress by most departing bees, which apparently respond to light entering the BAAD through the two transparent plexiglass panels (cover member 41 and baffle 54) along the departure pathway (FIGS. 2a, 4a, b). Without the welded wire covering, departing bees sometimes exit via arrival pathway 12.

Figure 1:
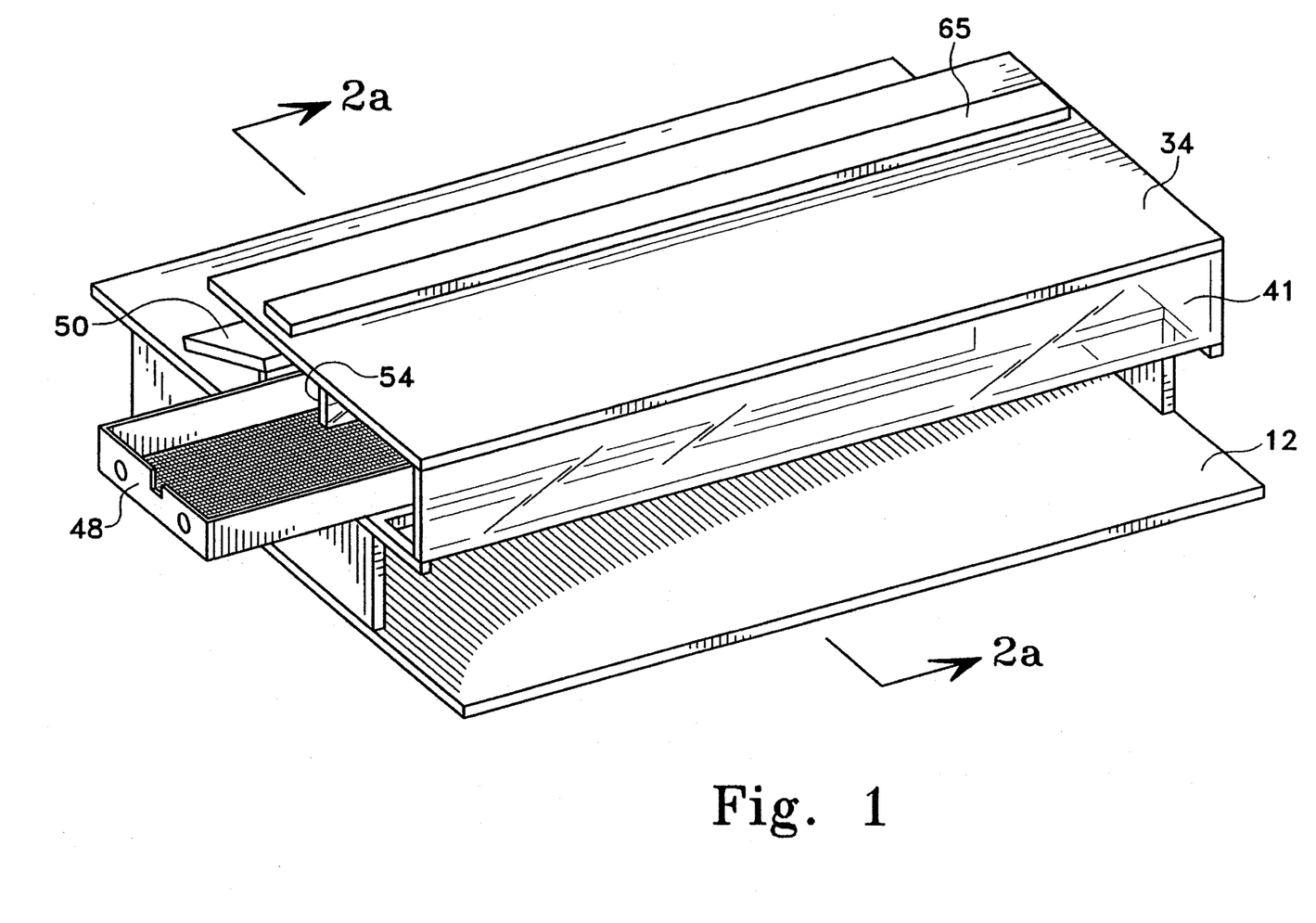
FIG. 1 shows a perspective view of the device of the invention.

Worker bees exiting the hive via the BAAD departure pathway 14 are forced by baffle 54 to pass through removable galvanized metal (28 gauge) tray 48 (FIGS. 1, 2a, 3a, 4a, 5a) which contains a biocontrol agent and a powdered carrier which helps convey the agent into the fields. The biocontrol agent applicator tray is removable from the side of the BAAD for loading the biocontrol agent bearing formulation (FIG. 1). The innermost transparent plexiglass barrier or baffle 54 fits loosely into the slotted ends of the applicator tray (FIGS. 2a, 4a) and also stabilizes the tray once it is installed. The biocontrol agent can be a virus, bacteria, fungi, rickettsia, nematode, eggs of predatory mites, etc. Any biocontrol agent can be used as long as it is not pathogenic to the bees. The powdered carrier can be a starch such as corn starch, talc, dust derived from crushed hulls of nuts, clay dust, or mixtures thereof. The biocontrol agent is dispersed in the powdered carrier to form a formulation. As bees move through the biocontrol agent applicator tray, their legs, underbodies, and in some instances their entire bodies, become surface-contaminated with the biocontrol agent formulation. As bees forage for nectar or pollen, some of the biocontrol agent is dislodged and is deposited on flowers and foliar surfaces. The BAAD and associated housing thus provide a novel method for bringing together pest and biocontrol agent without the use of conventional application technology. The BAAD offers promise for use in safe, efficient, and selective management strategies for primary pests of home gardens and commercial agriculture.

The following examples illustrate testing conditions of the device and the results. They are intended only to further illustrate the invention and are not intended to limit the scope of the invention as defined by the claims.

EXAMPLE 1

In the fall, four fields in Tift County, Georgia, averaging 0.4 hectares (ha) with a minimum separation of about 5 km, were fertilized with a broadcast application of 5-10-5 commercial fertilizer at a rate of 336 kg/ha, prepared for planting, and then planted with crimson clover seed at the rate of 22 kg/ha. Fields of *Trifolium incarnatum* L. (Family Leguminaceae), crimson clover, were selected as the test crop because *T. incarnatum* is a host of the seasonal $F_1$ generation of *Helicoverpa zea* (Boddie) (corn earworm, cotton bollworm, tomato fruitworm), and *Heliothis virescens* (F.) (tobacco budworm) and is readily foraged by *A. mellifera*. In February, nitrogen (ammonium nitrate) was broadcast on all fields at a rate of 84 kg/ha. During late March, four conventional *A. mellifera* hives consisting of two full-size frame bodies (24.5 cm by 30.0 cm by 50.5 cm) containing bee colonies of comparable size were each mounted atop a biocontrol agent applicator device containing 10% freeze-dried Heliothis nuclear polyhedrosis virus (HNPV) in talc. These were then transported to each of the test fields where they were placed on top of two 19 cm high, hollow concrete blocks at the approximate center of each field.

EXAMPLE 2

The biocontrol agent used in the test was Heliothis nuclear polyhedrosis virus (HNPV). However, any biocontrol agent which does not interfere with the ability of *A. mellifera* to perform normally could be used. The HNPV was produced in vivo in *H. zea* larvae. Dead virus infected larvae were collected daily in sterile distilled water containing gentamicin sulfate (Garamycin ™) at 100 ug/ml to inhibit bacterial development. The larvae were processed in an electric blender and the suspension diluted in 0.1 M phosphate buffer pH 7.0 and filtered through several layers of cheesecloth. The suspension was centrifuged at 3,000 RPM for 5 minutes, discarding the pellet. The remaining suspension was centrifuged three times at 5,000 RPM for 10 minutes, discarding the supernatant and resuspending the pellet in buffer. The final pellet was suspended in buffer with 100 ug/ml of gentamicin sulfate. A Petroff-Hausser bacteria counter was used to determine the number of polyhedral inclusion bodies (PIB) of the concentrated suspension. The suspension was then frozen and freeze dried. The dried preparation was weighed in order to determine the number of larval equivalents (LE) per gram. One larval equivalent equals $6 \times 10^9$ PIB (Ignoffo 1965). A 10% formulation of freeze-dried HNPV in talc was prepared. This contained 260LE/10 gram total weight.

EXAMPLE 3

When the test fields of crimson clover approached full bloom, 3–10 gram samples of the HNPV/talc formulation containing 260 LE each were placed in the trays of two of the BAAD between the hours of 1300 and 1530. The bees required approximately 45 minutes to remove the 3–10 gram samples. While the HNPV was being disseminated, the number of foraging *A. mellifera* was determined by sweeping each quadrant of a field five times with a standard 40 cm diameter cloth sweep net. Each sweep net was labeled and used exclusively in a designated field to lower the probability of cross-contamination by HNPV.

The mean number of *A. mellifera* captured by sweep net changed slightly with location (Table 2), due primarily to HNPV treated field 2, which reached full bloom later than did the control field, and continued blooming longer. This delay in blooming caused a greater number of honeybees to be retained in the treatment field than in the control field toward the end of the sampling period. The small numerical difference in the number of honeybees available to forage within treated and control fields of crimson clover could not, however, have substantially influenced the resulting large differences in the percentage of HNPV induced mortality of *H. zea* larvae (Table 1).

TABLE 1

| Treatment | x Percentage Mortality[a/] | |
|---|---|---|
| | Pretreatment | Post-treatment |
| Location 1 | | |
| NPV | 5.9 | 87.4a |
| Control | 5.2 | 11.2b |
| Location 2 | | |
| NPV | 5.2 | 73.9a |
| Control | 3.4 | 14.1b |

[a/]780 larval equivalents of Heliothis NPV were disseminated on each of four treatment dates. Means followed by the same letter within location are not significantly different (P > 0.05); pooled LSD = 8.56 (SAS Institute, Inc. 1987).

TABLE 2

| Treatment | x No. *A. mellifera* per five sweept[a/] |
|---|---|
| Location 1 | |
| NPV | 3.9a |
| Control | 3.7b |
| Location 2 | |
| NPV | 4.7a |
| Control | 3.2b |

[a/]Five samples per field were taken between 1100 and 1500 h on each of four dates. Means followed by the same letter within location are not significantly different (P = 0.05); pooled LSD = 0.69 (SAS Institute, Inc. 1987).

EXAMPLE 4

The following day, after HNPV dissemination, between 1100–1500 h, 15 samples of crimson clover heads were collected randomly from each test field quadrant with 5 clover heads per sample. Samples were placed in 30 ml plastic diet cups with lids for transport to laboratory. Flowers and fruit of the cranesbill, *Geranium carolinianum* L. occurring naturally in one treatment and two control fields of crimson clover, were collected and also used.

During collection of the clover heads and cranesbill flowers and fruit, within individual fields, the sterile latex gloves and scissors used by the collectors were washed with a 10% NaCl solution between quadrants. New sterile gloves were used for each field.

Five 3-day old *H. zea* larvae that developed from eclosion on pinto bean diet were transferred with a camel's hair brush into each cup. They were placed in an environmental chamber and held to continue development at 28°±1° C. and a 14:10 Light:Dark (L:D) photophase.

After approximately 72 hours, *H. zea* larvae were separated from the clover, placed into 30 ml diet cups containing about 10 ml of pinto bean diet, and allowed to complete development at 28°±1° C. and a 14:10 L:D photophase. Larvae were observed daily an mortality due to HNPV and other causes was recorded. Mortality due to HNPV was determined by the typical melting of the larva and/or by examination of larval remains for PIBS using phase microscopy.

The mean percentage of HNPV-induced mortality of *H. zea* larvae that fed on heads of crimson clover collected from the field-grown plants exposed to HNPV-contaminated *A. mellifera* was significantly higher over four post-treatment sampling dates than the mortality for larvae fed crimson clover heads collected from control fields. See Table 1.

Mortality of *H. zea* larvae that fed on flowers and fruit of *G. carolinianum* collected from the crimson clover fields exposed to HNPV-contaminated *A. mellifera* was approximately 17 and 42 times higher than the mortality for larvae fed on *G. carolinianum* collected from control fields. See Table 4. These data show that dissemination of HNPV by *A. mellifera* is not limited to crimson clover.

TABLE 3

| Treatment | x Percentage mortality (n)[a/] |
|---|---|
| Location 1 | |
| NPV | 26.7a |
| Control | 1.7b |
| Location 2 | |
| NPV | 41.7a |
| Control | 1.7b |

[a/]Means followed by the same letter within location are not significantly differnt ($P = 0.05$); pooled LSD = 7.99 (SAS Institute, Inc. 1987).

TABLE 4

| Treatment | x Percentage mortality (n)[a/] |
|---|---|
| NPV-Location 1 | 42.7 (42) |
| Control-Location 1 | 0.0 (49) |
| Control-Location 2 | 2.4 (51) |

[a/]No. of Larvae sampled per field

EXAMPLE 5

From two to three days after each HNPV application, random sweep net samples were taken in each field quadrant and, where possible, 10 Heliothis/Helicoverpa spp. larvae were collected and transferred into individual diet cups and allowed to develop as described above in Example 4.

The mean percentage mortality of Heliothis/Helicoverpa spp. larvae collected from the crimson clover fields exposed to HNPV-contaminated *A. mellifera* was significantly higher than that of larvae collected from control fields. See Table 3.

The lower percentage of mortality among field-collected Heliothis/Helicoverpa. spp. larvae relative to that observed for laboratory-reared *H. zea* fed excised clover heads from field plots (Table 1) may have resulted from their exposure to fewer flower heads or to reduced infectivity of the virus caused by exposure to sunlight (Jaques 1977). Alternatively, the differences in mortality rates may be a result of differential responses to HNPV by laboratory reared *H. zea* and the field population which averaged 98.5% *H. virescens*.

EXAMPLE 6

When sampling *A. mellifera*, as described in Example 3, darkened marks were observed on the sweep net. Furthermore, it was observed that there were more darkened marks from treated fields versus control fields. Upon examination, it was determined that the marks resulted from contacts made with deteriorating HNPV-infected Helliothis/Helicoverpa spp. larvae.

Based on these observations, an additional sweep cloth sampling method was devised. A square of white muslin sheeting was tightly secured with metal paper clips over a 30×30 cm square of 0.7 cm thick plyboard panel with a meter long garden tool handle attached. This sampling tool was applied to the field with the motion of a sweep net. Fifty sweeps/quadrant were taken in each field nine days after the final HNPV treatment was disseminated. A new muslin cloth was used for each quadrant. The number of darkened marks per cloth was counted. Cloths used on HNPV-treated fields had significantly more marks per 50 sweeps, x=11.1, than cloths from untreated fields, x=1.3. Based on these observations, this technique appears to be a promising tool for monitoring the effect of HNPV against Heliothis/Helicoverpa larvae.

EXAMPLE 7

After the final HNPV treatment, a single full frame of capped honey-filled comb was removed from each hive. The honey was manually squeezed from the comb through sterile cheese cloth after the comb was cut from the frame. It was stored at 26°±1° C. in total darkness in an environmental chamber. At 16, 64, and 170 days after the honey was collected, it was tested for HNPV contamination. Honey samples were serially diluted 1:9 with sterile water. One-tenth of a milliliter of sterile water, 0.1, 1.0, and 10.0% honey were added to the surface of pinto bean diet (approximately 800 mm$^2$). When the diet surface had dried, 1 day old *H. zea* larvae were placed onto the diet. Larval mortality due to HNPV was recorded daily for ten days. HNPV was detected in the honey from HNPV treatment hives. HNPV-induced mortality of *H. zea* fed on honey from the HNPV treatment hive in field one was significantly higher for all doses at all days post-treatment than larvae fed on honey from control hives. Mortality of larvae fed on honey from HNPV-treatment hive in field two was comparable for days 16 and 64 only. The mortality was noticeably lower for 170 days post-treatment. The difference likely resulted from a lowered level of HNPV infectivity due to fermentation of the honey. Larvae exposed to distilled water alone averaged a 1.1% mortality rate over all posttreatment sampling dates. See Table 5.

TABLE 5

| | x Percentage mortality[a/] | | |
|---|---|---|---|
| | Days post-treatment | | |
| Treatment[b/] | 16 | 64 | 170 |
| Location 1 | | | |
| C-0.1 | 1.2b | 1.1b | 0.0b |
| T-0.1 | 27.1a | 28.1a | 31.1a |
| C-1.0 | 2.3b | 2.2b | 0.0b |
| T-1.0 | 78.2a | 77.3a | 85.1a |
| C-10.0 | 2.2b | 6.0b | 2.5b |
| T-10.0 | 98.9a | 100.0a | 100.0a |
| Location 2 | | | |
| C-0.1 | 2.2a | 3.3b | 1.1a |
| T-0.1 | 7.1a | 16.7a | 2.3a |

TABLE 5-continued

| Treatment[b/] | x Percentage mortality[a/] Days post-treatment | | |
|---|---|---|---|
| | 16 | 64 | 170 |
| C-1.0 | 3.4b | 2.3b | 1.1a |
| T-1.0 | 43.3a | 39.6a | 6.7a |
| C-10.0 | 2.3b | 1.2b | 4.5a |
| T-10.0 | 93.0a | 82.9a | 10.0a |

[a/]Means followed by letters in common within locations, dosage, and date are not significantly different ($P > 0.05$) according to SAS General Linear Models Procedure, Least Squares Means Analysis (SAS Institute 1985, Goodnight & Harvey 1978).
[b/]C = Control; T = Heliothis NPV treatment (dosages 0.1, 1.0, or 10.0% honey).

The foregoing detailed description is for the purpose of illustration. Such detail is solely for that purpose and those skilled in the art can make variations therein without departing from the spirit and scope of the invention.

INDEX OF ELEMENTS DESIGNATED BY A NUMERAL

- 10 Device of Intention
- 12 Arrival Pathway
- 14 Departure Pathway
- 20 Hive Bottom
- 30 Bottom of Conventional Commercial Hive Body
- 32 Elongated Floor Member
- 34 Elongated Ceiling Member
- 36 Elongated Dividing Member
- 38 Front End of Dividing Member
- 41 Transparent Cover Member
- 43 Opening for Arrival
- 45 Opening for Departure
- 48 Tray
- 49 Direction of Tray Removal
- 50 Incline into Tray
- 52 Baffle in arrival pathway
- 54 Baffle in tray
- 58 Blocking Member
- 60 Bottom surface of downsized super
- 61 Downsized super structure
- 64 Blocking Member
- 65 Stop member
- 66 Stop member
- 68 Elongated opening
- 70 Mesh screen
- 72 Mesh size of 0.6 $cm^2$
- 74 1.2 $cm^2$ openings on either end of 70
- 75 Inclined walkway of arrival pathway

We claim:

1. A beehive-mounted device comprising a structure which frictionally fits into the opening of a downsized super, said structure having a floor member, a ceiling member, and a dividing member wherein said dividing member is positioned rearward relative to the front ends of said floor and ceiling members and taken together said floor, ceiling and dividing members define separate arrival and departure pathways for bees entering and exiting said beehive.

2. The device of claim 1 wherein said structure further comprises structural side walls.

3. The device of claim 2 wherein the structure further comprises
a removable tray positioned on the top surface of said dividing member,
a downwardly extending baffle attached to the bottom surface of said dividing member, and
a downwardly extending baffle attached to the bottom surface of said ceiling member and extending into top volume of said tray.

4. The device of claim 3 wherein said baffle attached to the bottom surface of the ceiling member is transparent and said baffle attached to bottom surface of said dividing member is opaque.

5. The device of claim 3 wherein said structure further comprises a positively sloped incline positioned behind and leading up to said tray which provides an inclined walkway for departing bees to enter said tray.

6. The device of claim 5 wherein said tray further comprises a non-skid bottom interior surface.

7. The device of claim 5 wherein said ceiling, floor, and dividing members, structural side walls, said downwardly extending baffle connected to bottom surface of said dividing member, and said positively sloped incline are painted black.

8. The device of claim 3 wherein said tray contains a composition comprising a biocontrol agent and an acceptable biocontrol agent powdered carrier.

9. The device of claim 1 further comprising a transparent cover member connected to front end of the ceiling member wherein the cover member together with the floor member define the opening for said arrival pathway and the cover member together with said dividing member define the opening for said departure pathway.

10. The device of claim 1 wherein said floor member further comprises a non-skid top surface.

11. A downsized super comprising
a beehive-mounted device which frictionally fits into an opening of said downsized super,
said device having a floor member, a ceiling member, and a dividing member wherein said dividing member is positioned rearward relative to the front ends of said floor and ceiling members and taken together said floor, ceiling, and dividing members define separate arrival and departure pathways for bees entering and exiting said device.

12. The downsized super of claim 11 further comprising structural side walls,
a removable tray positioned on the top surface of said dividing member and containing a biocontrol agent and an acceptable biocontrol agent powdered carrier,
a downwardly extending baffle attached to the bottom surface of said dividing member, and
a downwardly extending baffle attached to the bottom surface of said ceiling member and extending into a top volume of said tray.

13. The downsized super of claim 12 further comprising a mesh screen covering a rear opening of said arrival pathway of bees entering said downsized super.

14. The downsized super of claim 13 wherein said screen comprises a plurality of openings of about 0.6 $cm^2$ and two openings of about 1.2 $cm^2$.

15. A beehive comprising a downsized super containing
a beehive-mounted device which frictionally fits into an opening of said downsized super,
said device having a floor member, a ceiling member, and a dividing member wherein said dividing member is positioned rearward relative to the front ends of said floor and ceiling members and taken together said floor, ceiling, and dividing members define separate arrival and departure pathways for bees entering and exiting said device.

16. The beehive of claim 15 wherein said device further comprises
structural side walls,
a removable tray positioned on the top surface of said dividing member and containing a biocontrol agent and an acceptable biocontrol agent powdered carrier,
a downwardly extending baffle attached to the bottom surface of said dividing member, and
a downwardly extending baffle attached to the bottom surface of said ceiling member and extending into a top volume of said tray.

17. The beehive of claim 16 wherein said device further comprises a mesh screen covering a rear opening of said arrival pathway of bees entering said device.

18. A method for dissemination of a biocontrol agent to plants by bees comprising
locating a beehive comprising a downsized super containing a structure which frictionally fits into an opening of said downsized super,
said structure having a floor member,
(a) a ceiling member, and a dividing member wherein said dividing member is positioned rearward relative to the front ends of said floor and ceiling members and taken together said floor, ceiling, and dividing members define separate arrival and departure pathways for bees entering and exiting said structure,
(b) structural side walls,
(c) a removable tray positioned on the top surface of said dividing member and containing a biocontrol agent and an acceptable biocontrol agent powdered carrier,
(d) a downwardly extending baffle attached to the bottom surface of said dividing member, and
(e) a downwardly extending baffle attached to the bottom surface of said ceiling member and extending into a top volume of said tray,
allowing said bees to depart from said hive by moving through the biocontrol agent and powdered carrier composition in said tray wherein the bees become contaminated with said composition, and
allowing said bees to forage on said plants wherein the biocontrol agent and powdered carrier composition is deposited on said plants.

* * * * *